(12) United States Patent
Kumar et al.

(10) Patent No.: US 10,936,607 B2
(45) Date of Patent: Mar. 2, 2021

(54) OPTIMIZING DATA ACCESS FROM A FEDERATED REPOSITORY BASED ON CONCORDANCE FREQUENCY

(71) Applicant: International Business Machines Corporation, Armonk, NY (US)

(72) Inventors: Balaji S. Kumar, Bangalore (IN); John Kurian, Bangalore (IN); Vishal G. Palliyathu, Bangalore (IN); Rohan S. Zunzarrao, Pune (IN)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 15/684,993

(22) Filed: Aug. 24, 2017

(65) Prior Publication Data

US 2019/0065562 A1 Feb. 28, 2019

(51) Int. Cl.
| | |
|---|---|
| *G06F 16/25* | (2019.01) |
| *G06F 16/248* | (2019.01) |
| *G06F 9/445* | (2018.01) |
| *G06F 16/2458* | (2019.01) |
| *G06Q 10/10* | (2012.01) |

(52) U.S. Cl.
CPC ........ *G06F 16/248* (2019.01); *G06F 9/44505* (2013.01); *G06F 16/2471* (2019.01); *G06F 16/256* (2019.01); *G06Q 10/10* (2013.01)

(58) Field of Classification Search
CPC .............. G06F 16/248; G06F 16/2471; G06F 9/44505; G06F 16/338; G06F 16/256; G06F 16/903; G06F 16/953; G06F 16/90335; G06Q 10/10
See application file for complete search history.

(56) References Cited

U.S. PATENT DOCUMENTS

| | | | |
|---|---|---|---|
| 6,507,837 B1 * | 1/2003 | De La Huerga | G06F 16/951 |
| 8,370,349 B2 | 2/2013 | Quoc et al. | |
| 2005/0108219 A1 * | 5/2005 | De La Huerga | G06F 16/27 |
| 2006/0288001 A1 * | 12/2006 | Costa | G06F 16/951 |
| 2012/0016891 A1 | 1/2012 | Pechanec et al. | |
| 2013/0133056 A1 * | 5/2013 | Taylor | G06F 21/41 |
| | | | 726/8 |
| 2015/0026171 A1 * | 1/2015 | Tanner | G06F 16/248 |
| | | | 707/728 |
| 2019/0179820 A1 * | 6/2019 | El Kaed | G06F 16/256 |

* cited by examiner

*Primary Examiner* — Alicia M Willoughby
(74) *Attorney, Agent, or Firm* — Schmeiser, Olsen & Watts; William H. Hartwell (57) ABSTRACT

A method and associated systems improve access time of a federated repository that represents a set of individual data repositories as a virtualized aggregated repository. An analyzer module counts the number of entries in each individual repository that are associated with each possible value of a selected concordance parameter. The analyzer stores these counts in a Concordance Frequency Table. When the federated-repository manager receives a data-access request, the analyzer associates the requested data element with a corresponding value of the concordance parameter. The analyzer then uses information stored in the Table to select an optimal sequence in which the federated-repository manager should search the repositories for the requested data. This optimal sequence orders the repositories such that the first repositories to be searched will be those that contain the greatest number of entries associated with the concordance-parameter value of the requested data.

20 Claims, 5 Drawing Sheets

OPTIMIZING DATA ACCESS FROM A FEDERATED REPOSITORY BASED ON CONCORDANCE FREQUENCY

BACKGROUND

The present invention relates to optimizing performance in an enterprise computing environment and, in particular, improving response time when accessing data stored in a federated registry or other type of federated data repository.

A user repository or registry is a primary repository used for storing information about each user and workgroup in a distributed computing environment, such as an enterprise environment or certain types of virtualized computing environment.

A single enterprise or other type of distributed computing environment may comprise many different domains that each has one or more user data repositories, and each repository may take a different form or may conform to a different set of standards or conventions. An enterprise's repositories may, for example, comprise LDAP directories, relational databases, operating-system registries, z/OS System Automation Facility registries, multidimensional spreadsheets, simple flat files, and any other type of logical data-storage means known in the art, each of which is capable of accumulating large amounts of user data over time.

In such a computing environment, a Repository Manager module may simplify the management of a large number of heterogeneous user-data repositories by presenting those repositories as a single "federated" registry. Such a federated registry may provide a single shared interface to the aggregated federated repository when responding to a data request, made by a software application or by a user, where that data may be required for user authentication, user authorization, or other types of services.

This mechanism thus provides simplified access to data stored in all repositories associated with an enterprise computing environment, regardless of the platform or domain of each repository, and regardless of whether an individual repository may normally be specific to a particular application. Such data may, for example, identify characteristics of clients in a multi-tenant environment, or of individual users or organizations, and may comprise metadata and user profiles that identify business roles, relationships, memberships, security levels, and many other types of implementation-specific characteristics

SUMMARY

An embodiment of the present invention provides a system for optimizing data-access from a federated repository,
where the federated repository is a virtualized data repository containing data entries that are physically stored in a plurality of component repositories,
where access to the federated repository is managed by a federated-repository management application, and
where the system comprises a processor, a memory coupled to the processor, and a computer-readable hardware storage device coupled to the processor, the storage device containing program code configured to be run by the processor via the memory to implement a method for optimizing data access from a federated repository based on concordance frequency, the method comprising:

the system receiving, from the federated-repository management application, a request to access a requested data element contained in the federated repository;

the system identifying a concordance parameter capable of characterizing each data entry stored in the plurality of component repositories, where the characterizing comprises associating each data entry with a corresponding value of the concordance parameter;

the system associating the requested data element with a requested-data value of the concordance parameter;

the system determining, as a function of the concordance parameter, a set of location probabilities, where each location probability of the set of location probabilities identifies a probability that the requested data element is located in a corresponding repository of the plurality of component repositories; and the system returning to the federated-repository management application a sequence in which to query each repository of the plurality of component repositories, where the sequence orders the plurality of component repositories as a monotonically decreasing function of each component repository's corresponding location probability.

Another embodiment of the present invention provides a method for optimizing data access from a federated repository based on concordance frequency,
where the federated repository is a virtualized data repository containing data entries that are physically stored in a plurality of component repositories, and
where access to the federated repository is managed by a federated-repository management application,
the method comprising:

receiving, from the federated-repository management application, a request to access a requested data element contained in the federated repository;

identifying a concordance parameter capable of characterizing each data entry stored in the plurality of component repositories, where the characterizing comprises associating each data entry with a corresponding value of the concordance parameter;

associating the requested data element with a requested-data value of the concordance parameter;

determining, as a function of the concordance parameter, a set of location probabilities, where each location probability of the set of location probabilities identifies a probability that the requested data element is located in a corresponding repository of the plurality of component repositories; and returning to the federated-repository management application a sequence in which to query each repository of the plurality of component repositories, where the sequence orders the plurality of component repositories as a monotonically decreasing function of each component repository's corresponding location probability.

Yet another embodiment of the present invention provides a computer program product, comprising a computer-readable hardware storage device having a computer-readable program code stored therein, the program code configured to be executed by a federated-repository optimization system comprising a processor, a memory coupled to the processor, and a computer-readable hardware storage device coupled to the processor, the storage device containing program code configured to be run by the processor via the memory to implement a method for optimizing data access from a federated repository based on concordance frequency,
where the federated repository is a virtualized data repository containing data entries that are physically stored in a plurality of component repositories, and where access to the federated repository is managed by a federated-repository management application, the method comprising:

receiving, from the federated-repository management application, a request to access a requested data element contained in the federated repository;

identifying a concordance parameter capable of characterizing each data entry stored in the plurality of component repositories, where the characterizing comprises associating each data entry with a corresponding value of the concordance parameter;

associating the requested data element with a requested-data value of the concordance parameter;

determining, as a function of the concordance parameter, a set of location probabilities, where each location probability of the set of location probabilities identifies a probability that the requested data element is located in a corresponding repository of the plurality of component repositories; and returning to the federated-repository management application a sequence in which to query each repository of the plurality of component repositories, where the sequence orders the plurality of component repositories as a monotonically decreasing function of each component repository's corresponding location probability.

DETAILED DESCRIPTION

Distributed computing environments may simplify the access of user information by means of a simplified shared interface that represents numerous data repositories and registries as a single aggregated "federated" repository. In such implementations, only a single request for user-related, workgroup-related, or other types of information need be forwarded to a Federated Repository Manager 215 that manages access to the federated repository. In response, the FRM 215 automatically and transparently queries the individual repositories that underlie the federated repository. This method of querying a single FRM 215 can greatly simplify the performance of user authentication, user authorization, and other types of tasks by obviating the need for a requestor to manually query every individual repository.

This approach suffers, however, from a technical problem because even a Federated Repository Manager 215 may have to query many individual registries in order to service a single data request. Although a data requestor, such as a user, a workgroup, a system administrator, or a software application, may need to submit only one query to a Federated Repository Manager 215, the FRM 215 still needs to query every individual repository 220a-220f until the FRM 215 can locate the requested data. In implementations that comprise a large number of repositories, each of which may identify very large numbers of users, a single data request to an FRM 215 may thus produce thousands of individual queries and search through millions of user profiles.

Federated repository manager known in the art generally search repositories in a predetermined sequence, or in round-robin fashion, until the requested data is found. The resulting number of queries and the resulting access time is thus unpredictable and, when a requested data element is located in one of the last repositories in a predetermined sequence, even a federated-repository query can waste unacceptable amounts of time, energy, network bandwidth, and computing overhead.

Such a technical problem exists in almost any federated computing environment that comprises numerous, often heterogeneous, repositories, and is necessarily rooted in such computing technology.

Embodiments of the present invention provide a technical solution to this technical problem by improving upon the operation of federated-repository managers. This technical solution comprises a specialized concordance table, an associated software enhancement to a Federated Repository Manager 215, and methods of creating, using, and updating the concordance table. In this document, the term "concordance" is given its conventional meaning within the field of federated computing environments, as an enumeration of user-related information comprised by a federated repository.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
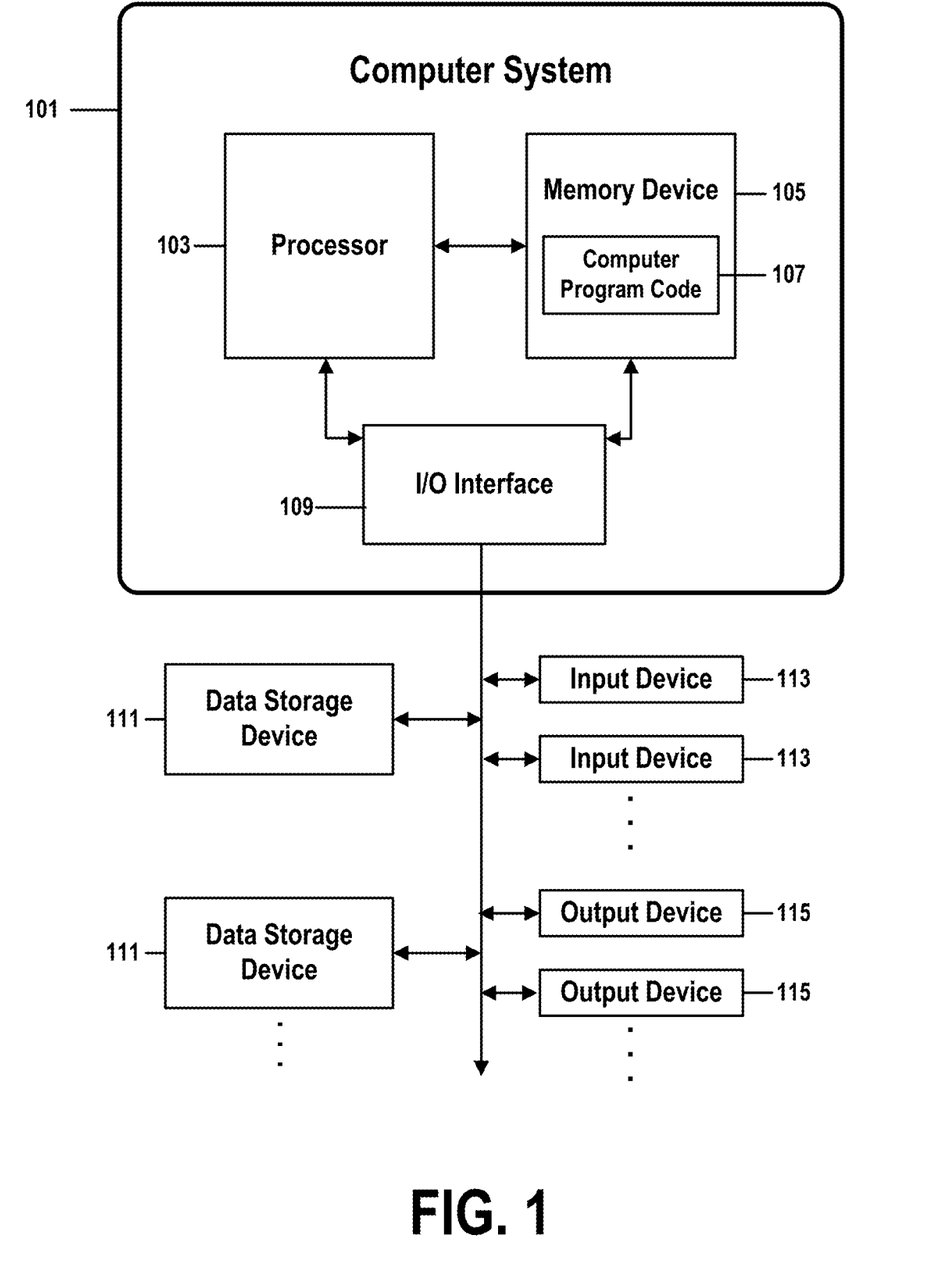
FIG. 1 shows the structure of a computer system and computer program code that may be used to implement a method for optimizing data access from a federated repository based on concordance frequency in accordance with embodiments of the present invention.

FIG. 1 shows a structure of a computer system and computer program code that may be used to implement a method for optimizing data access from a federated repository based on concordance frequency in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for optimizing data access from a federated repository based on concordance frequency in accordance with embodiments of the present invention, and may implement other embodiments described in this specification, including the methods illustrated in FIGS. 1-5. The data storage devices 111 may store the computer program code

107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for optimizing data access from a federated repository based on concordance frequency.

Any of the components of the present invention could be created, integrated, hosted, maintained, deployed, managed, serviced, supported, etc. by a service provider who offers to facilitate a method for optimizing data access from a federated repository based on concordance frequency. Thus the present invention discloses a process for deploying or integrating computing infrastructure, comprising integrating computer-readable code into the computer system 101, wherein the code in combination with the computer system 101 is capable of performing a method for optimizing data access from a federated repository based on concordance frequency.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for optimizing data access from a federated repository based on concordance frequency may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for optimizing data access from a federated repository based on concordance frequency is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
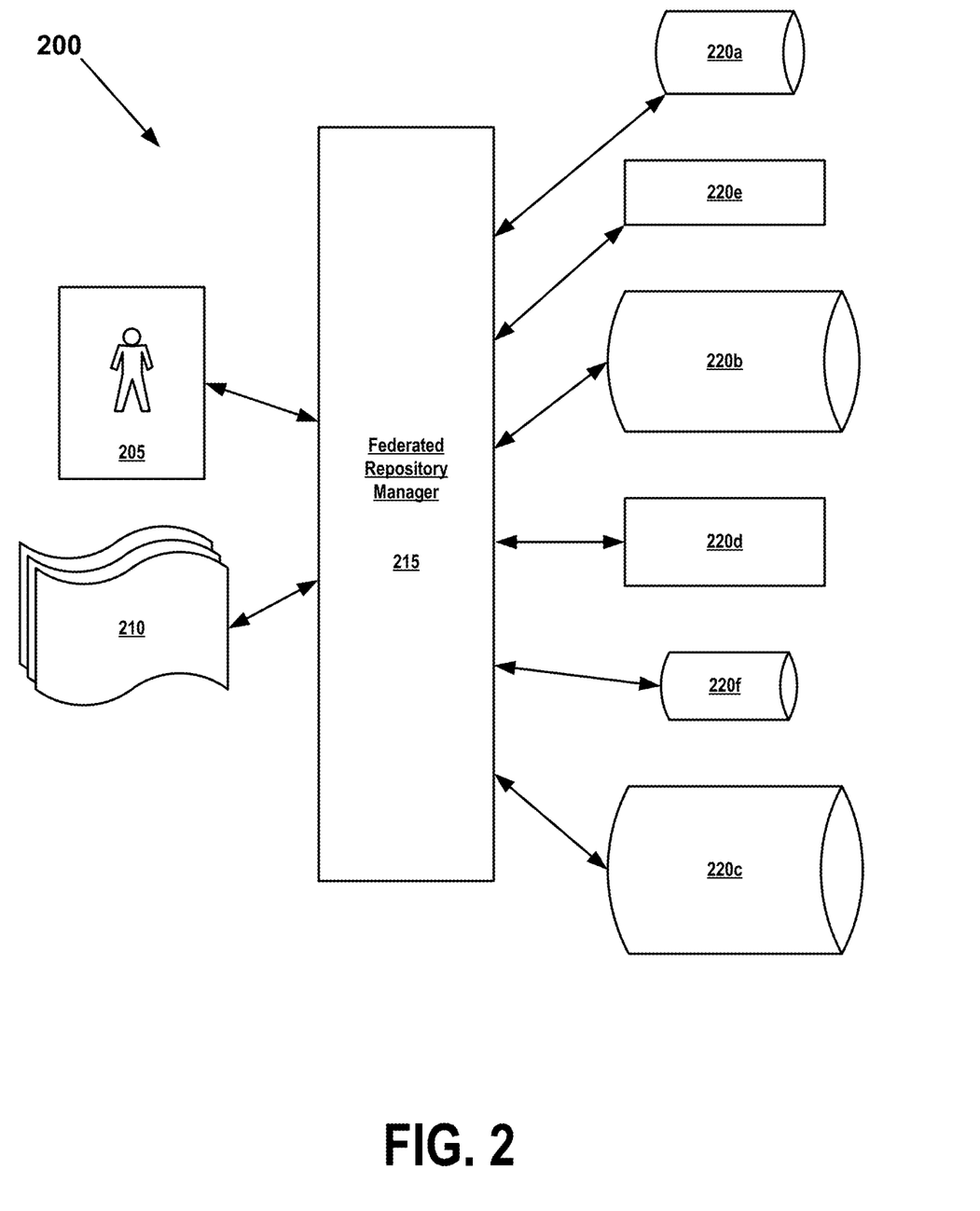
FIG. 2 illustrates a topology of a federated-registry management system, as is known in the art.

FIG. 2 illustrates a topology of a federated-registry management system 200, as is known in the art. FIG. 2 shows items 200-220*f*.

In this implementation, a distributed computing environment comprises a plurality of individual data repositories 220*a*-220*f*. There is no requirement for any of the repositories 220*a*-220*f* to conform to a same format, standard, or storage convention and the repositories 220*a*-220*f* may thus include a variety of databases, operating-system registries, spreadsheet worksheets, and flat files. Although only six repositories 220*a*-220*f* are shown in FIG. 2, real-world embodiments of the present invention may comprise very large numbers of repositories distributed across numerous domains throughout the distributed computing environment.

Each of these individual repositories stores information related to one or more users, workgroups, applications, or other entities comprised by or associated with the computing environment. One repository might, for example, be a relational database that stores email addresses, usernames, passwords, and personally identifying information about users registered to a particular domain comprised by the computing environment. Another repository might comprise a secured, encrypted application registry that records security and authentication codes of users of a mission-critical application that runs across multiple domains of the distributed computing environment.

Requestor users 205 and requestor applications 210 may request user information, workgroup information, or other types of data stored in any of repositories 200a-220f by submitting a data request or query to Federated Repository Manager 215. FRM 215 provides a single point of access to data stored in the repositories 220a-220f by representing those repositories 220a-220f as a single, aggregated "federated" repository.

For example, an email application 210 may attempt to authorize a user USER1 to access a mail file by requesting authentication parameters from the federated repository maintained by FRM 215. FRM 215 responds by querying repositories 220a-220f in a predetermined order, until it finds the requested parameters on repository 220d. FRM 215 then fetches the parameters and returns them to requestor application 210. From the viewpoint of application 210, one data request was made to a single federated repository, but this single request resulted in the FRM 215 querying a sequence of repositories until finding the requested data on repository 220f.

Figure 3:
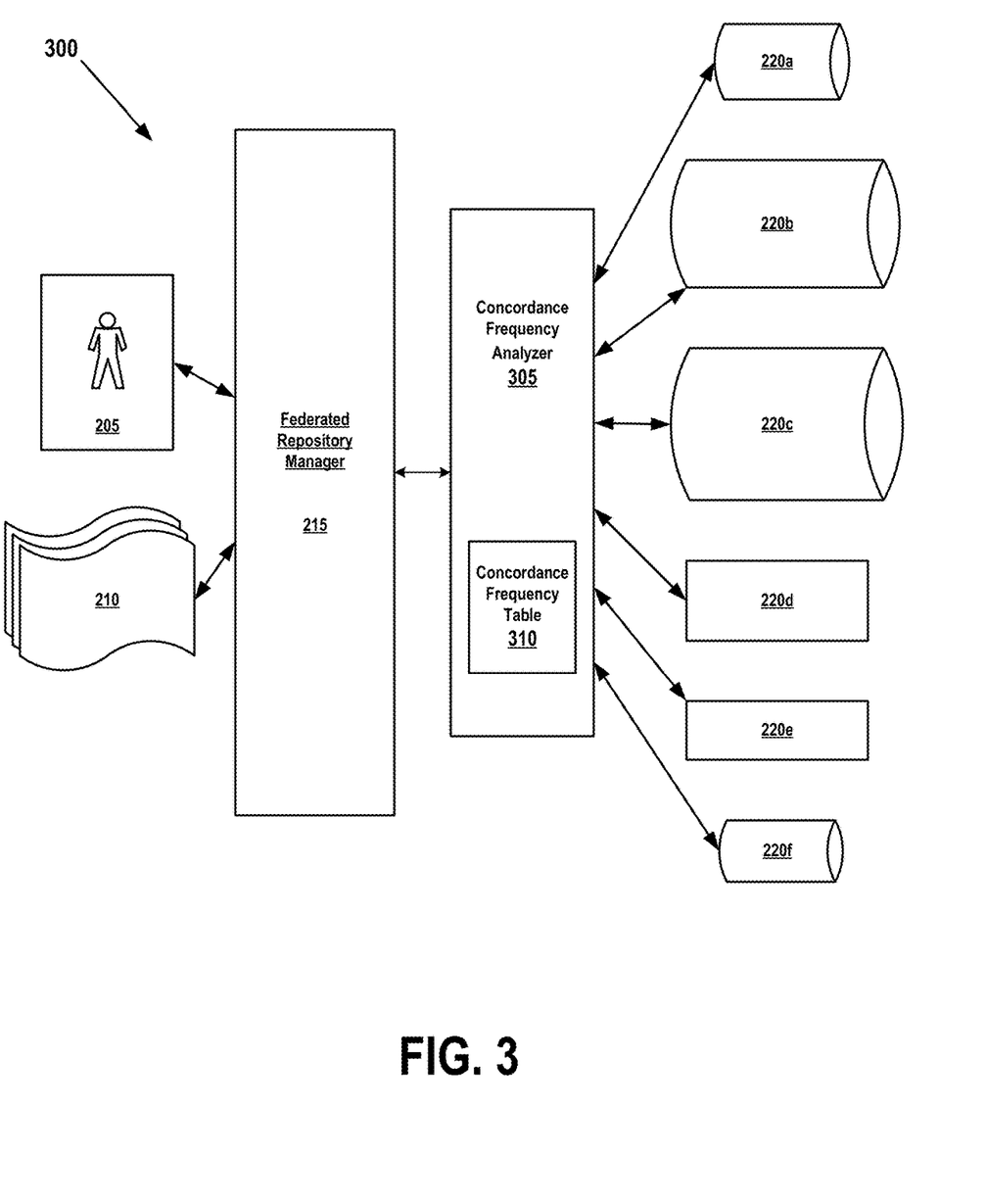
FIG. 3 illustrates a topology of an enhanced federated-registry management system that has been optimized based on concordance frequency in accordance with embodiments of the present invention.

FIG. 3 illustrates a topology of an enhanced federated-registry management system 300 that has been optimized based on concordance frequency in accordance with embodiments of the present invention. FIG. 3 comprises items 205-220f and 300-310. Items 205-220f are identical in form and function to similarly numbered items of FIG. 2.

In this embodiment, the Federated Repository Manager 215 has been enhanced by a Concordance Frequency Analyzer (CFA) module 305 that in turn comprises a Concordance Frequency Table (CFT) 310. In FIG. 3, CFA 305 and CFT 310 are shown as a standalone module independent of FRM 215, but in other embodiments, CFA 305 or CFT 310 may be implemented as an internal component of the Federated Repository Manager 215.

Figure 4:
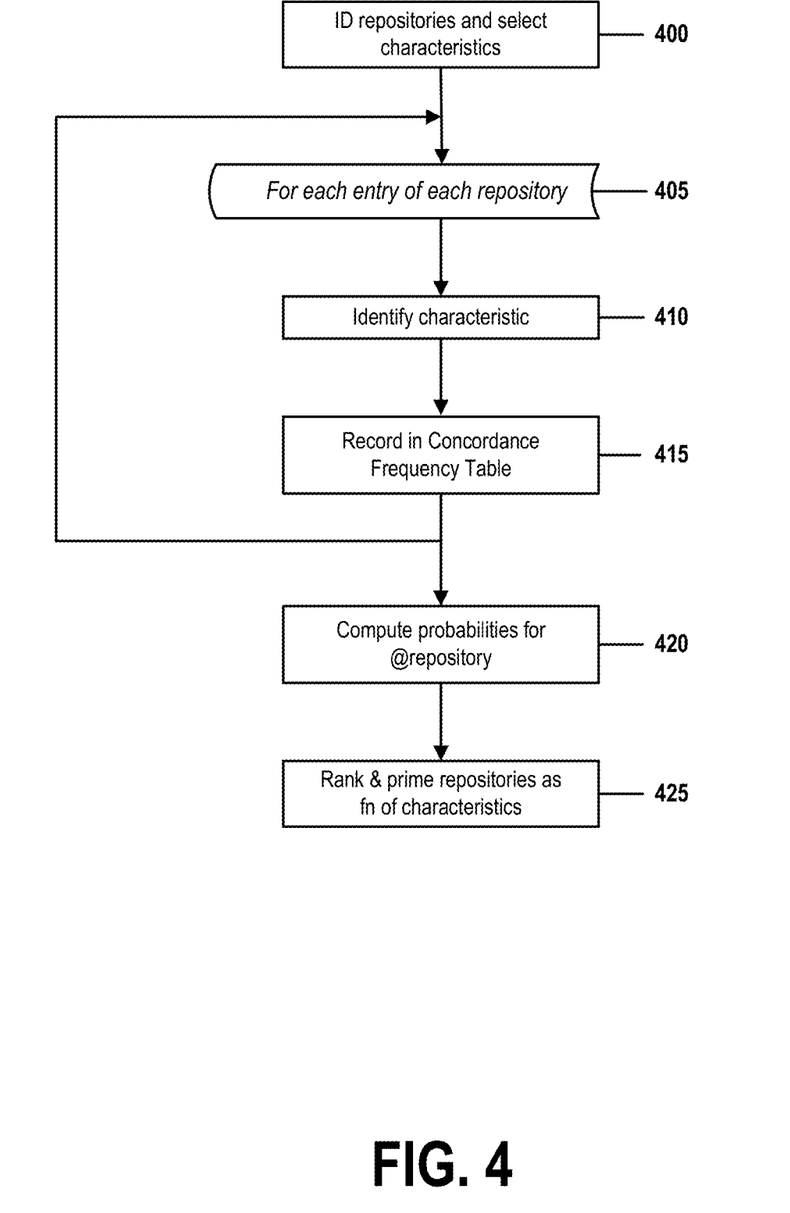
FIG. 4 is a flow chart that illustrates steps of a method for initializing a concordance frequency table in accordance with embodiments of the present invention.
Figure 5:
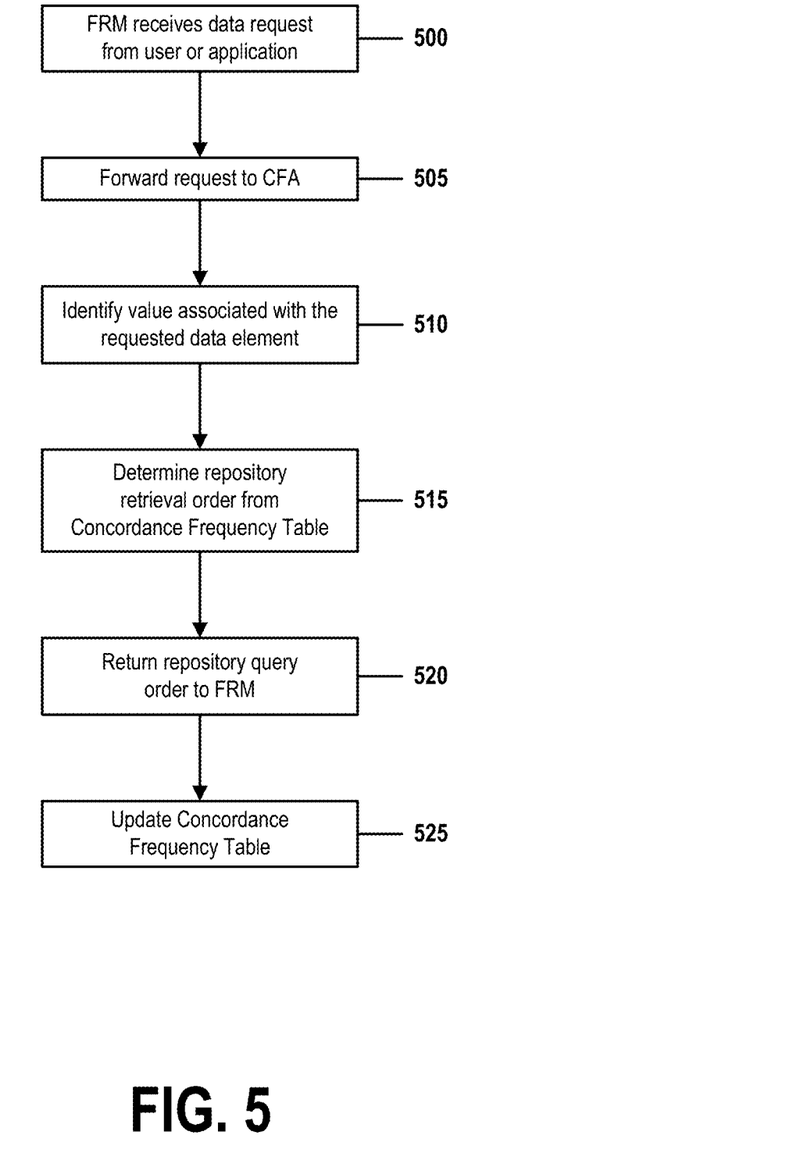
FIG. 5 is a flow chart that illustrates steps of a method for optimized data retrieval by priming a federated repository based on concordance frequency in accordance with embodiments of the present invention.

As described in FIGS. 4-5, the Concordance Frequency Analyzer 305 is capable of determining an optimal order in which Federated Repository Manager 215 should query repositories 200a-220f in response to a particular data request from a user 205 or application 210. The CFA 305 determines this order as a function of a selected characteristic of the requested data or of the query itself, and it performs this determination by referring to entries in the Concordance Frequency Table 310. Steps of this determination are described in detail in FIG. 5.

As a result, the Federated Repository Manager 215, as directed by the Concordance Frequency Analyzer 305, queries repositories 200a-220f in an order that has a highest probability of being a most efficient order when attempting to locate a particular requested data item. In this way, the resulting enhanced federated repository mechanism 300 addresses the inefficiencies inherent in known methods of data retrieval from a federated repository.

FIG. 4 is a flow chart that illustrates steps of a method for initializing a concordance frequency table 305 in accordance with embodiments of the present invention. FIG. 4 comprises steps 400-425, which are performed by components described in FIG. 3.

In step 400, the Concordance Frequency Analyzer 305 of the enhanced federated repository mechanism 300 is initialized with information specific to a particular embodiment of the present invention. This information includes identifications of repositories 200a-200f comprised by the federated repository managed by Federated Repository Manager 215. The information also includes an identification of one or more characteristics upon which the Concordance Frequency Table 310 will be based.

This information will allow the Analyzer 305 to create a Table 310 from which may be determined a probability that a particular requested data element is likely to be found in a particular repository of the repositories 220a-220f. As will be described below, these probabilities will be determined by correlating values of the one or more characteristics associated with the requested data element with corresponding values of the one or more characteristics associated with entries of each repository.

Step 405 begins an iterative procedure of steps 405-415. This procedure repeats once for each entry of each repository of repositories 220a-220f. For example, if six repositories 220a-220f each comprise 100 entries, each of which is a profile of a distinct user, then the iterative procedure would be performed 600 times.

In step 410, the Concordance Frequency Analyzer 305 identifies values of the one or more characteristics of an entry in one of repositories 220a-220f. For example, if the one or more characteristics comprise the first letter of a user's email address, and if the current iteration of the iterative procedure of steps 405-415 is evaluating a user-profile entry of repository 220d for user "User0975," the CFA 305 in this step would identify a value of "U."

In step 415, the Concordance Frequency Analyzer 305 records to the Concordance Frequency Table 310 the value identified in step 410. This recording may comprise incrementing an appropriate frequency count in Table 310 that tracks the number of entries within a particular repository match the value identified in step 410.

In the running example, if the Concordance Frequency Table 310 contains an entry that identifies that 257 user profiles in repository 220d are associated with usernames that begin with the letter "U," then the Analyzer 305 would in this step increment that entry to indicate that 258 profiles have now been found in repository 220d that satisfy the same condition. This procedure is illustrated in greater detail in the example below.

At the conclusion of the final iteration of the procedure of steps 405-415, the Concordance Frequency Analyzer 305 will have constructed a Concordance Frequency Table 310 that enumerates the number of occurrences of each value of the one or more characteristics identified in step 400 that currently occur in each repository of the repositories 220a-220f identified in step 400.

In step 420, the Analyzer 305 computes probabilities that data entries associated with each possible value of the one or more characteristics may be found in each repository 220a-220f. This computation may be performed by any means known in the art, including steps as simple as merely counting, comparing, and normalizing the number of occurrences of each value in each repository 220a-220f. Continuing the running example, if repository 220a contains 1000 entries associated with usernames that begin with the letter "U." repository 220d contains 3000 entries associated with usernames that begin with the letter "U," and no other repository contains an entry associated with a username that begins with the letter "U," then the Analyzer 305 in this step might compute that there is a 25% chance that any requested data associated with a username beginning with the letter "U" will be found in repository 220a, and that there is a 75% chance that such requested data will be found in repository 220d.

Embodiments of the present invention are flexible enough to accommodate any other method of computing probabilities known in the art, including statistical methods that employ a linear-regression analysis, that assign weightings to particular values when computing probabilities, that adjust probabilities in accordance with desired confidence levels, or that fit computed probability distributions onto known types of statistical models.

In step 425, the system may rank each repository as a function of the probabilities computed in step 420. In some embodiments, this ranking might comprise ordering the repositories 220a-220f from highest to lowest probability for each possible value of the one or more characteristics. In the running example, this ranking might comprise defining 36 different sequences of repositories 220a-220f, where each sequence is optimized to identify the most efficient search order for entries associated with usernames that begin with a particular letter of the alphabet or single digit. If, for example, a user requests a user profile for a user whose username begins with the letter "U," the Concordance Frequency Analyzer 305 would use the information in the Concordance Frequency Table 310 to determine that a search for that profile should begin with repository 220d (where there is a 75% chance of finding that profile) and, if the desired profile is not found in repository 220d, conclude by querying repository 220a (the only other repository that contains profiles associated with usernames that begin with the letter "U.")

FIG. 5 illustrates an embodiment of the present invention that uses the resulting Concordance Frequency Table 310 to perform such an optimized lookup.

In one simple example, consider an enterprise computing environment that comprises three user repositories: "User Repository 1," "User Repository 2," and "User Repository 3." In this exemplary embodiment, the one or more characteristics to be tracked by the concordance is the first alphabetic character of a user's email address.

The three repositories contain entries that each comprise a user profile, and those profiles are associated with the email addresses listed in Table 1.

TABLE 1

| User Repository 1 | User Repository 2 | User Repository 3 |
| --- | --- | --- |
| broome@xzz.com | Sam027@xyz.com | george@xzy.com |
| Sam119@xzz.com | sonny@xyz.com | vishal@xzy.com |
| Antonio@xzz.com | rutger@xyz.com | randall@xzy.com |
| george741@xzz.com | victor@xyz.com | govind@xzy.com |
| diwakar@xzz.com | sanjay@xyz.com | matisha@xzy.com |
| sally@xzz.com | john@xyz.com | ratclif@xzy.com |

As described above, the Concordance Frequency Analyzer 305 would in steps 410 and 415, count the number of entries in each repository that are associated with each of the 26 possible case-insensitive alphabetic characters. The Analyzer 305 would then record the frequencies of occurrence of each possible character value in the Concordance Frequency Table 310. The resulting CFT 310 is shown in Table 2, with non-occurring values omitted for clarity.

TABLE 2

| First Character in Email Address | User Repository 1 | User Repository 2 | User Repository 3 |
| --- | --- | --- | --- |
| a | 1 | 0 | 0 |
| b | 1 | 0 | 0 |
| d | 1 | 0 | 0 |
| g | 1 | 0 | 2 |
| j | 0 | 1 | 0 |
| m | 0 | 0 | 1 |
| r | 0 | 1 | 2 |
| s | 2 | 3 | 0 |
| v | 0 | 1 | 1 |

In this example, Table 2 shows that User Repository 1 stores one profile associated with an email address that begins with the letter "g" ("george741 @xzz.com"), that User Repository 2 stores no profiles associated with an email address that begins with the letter "g," and that User Repository 3 stores two profiles associated with email addresses that begin with the letter "g" ("george@xzy.com" and "govind@xzy.com").

The CFA 305 might then, in accordance with the procedure of step 420, use this information to compute probabilities or relative likelihoods of each repository storing a requested user profile associated with each specific first character. If computing probabilities, the CFA would determine that a request for a user profile associated with an email address beginning with the letter "g" would have a 33.3% chance of being found in User Repository 1, a 66.7% chance of being found in User Repository 3, and a 0% chance of being found in User Repository 2.

Regardless of whether the system performs optional step 420, the CFA 305 in step 425 would identify an optimal repository search order for each value of the characteristic identified in step 400. For example, if searching for a profile associated with an email address beginning with the letter "g," the Analyzer 305 would direct the Federated Repository Manager 215 to first query User Repository 3, and then (if the desired profile is not found in User Repository 3), to next query User Repository 1. Similarly, if searching for a profile associated with an email address beginning with the letter "s," the Analyzer 305 would direct the Federated Repository Manager 215 to first query User Repository 2, and then (if the desired profile is not found in User Repository 2), to next query User Repository 1.

Although examples and embodiments described in this document describe only a few possible characteristics that may be used to develop a Concordance Frequency Table 310, the present invention is flexible enough to comprise embodiments that analyze concordances of any characteristics or parameters capable of distinguishing repository entries.

In one example, the CFA 305 may build a Table 310 that records numbers of repository entries associated with specific levels of security clearance, with relative sizes of users' transaction histories, with a number of purchases made through a particular e-commerce mechanism, with demographic information like a place of residence or an income level, or with a number of connections to users in certain workgroups.

In other embodiments, it may be possible to use different sets of characteristics to characterize entries of different repositories. This may result in the creation of more than one Concordance Frequency Table 310 or may result in the creation of a complex variation of Concordance Frequency Table 310 capable of storing occurrence frequencies for more than one set of characteristics.

In one example, an embodiment may use values of security-clearance levels characterize entries in repositories related to access control, but use values of a specific type of personally identifying information to track entries in repositories related to e-commerce transactions. In such cases, this portioning may be deemed to be more efficient if an implementer knows a certain subset of repositories contain only security-related data, making it unnecessary to query the e-commerce repositories when servicing a query related to user access control.

Similarly, the examples and embodiments described in this document should not be construed to limit alphanumeric pattern-matching to single-character values. In embodiments that comprise extremely large numbers or very small numbers of users or repositories, an implementer may determine that greater efficiency or lower resource consumption may be obtained by tracking the first two characters or the first three characters of a user identifier or email address, or may track multiple characteristics, such as a Zip Code of a user's residence and a first character of a user's online username. Many other such combinations of parameters are possible.

FIG. 5 is a flow chart that illustrates steps of a method for optimized data retrieval by priming a federated repository based on concordance frequency in accordance with embodiments of the present invention. FIG. 5 comprises steps 500-525, which are performed by components described in FIG. 3.

In step 500, the Federated Repository Manager 215 receives a data request from a requestor, such as a user 205 or a software application 210. This data request may comprise any sort of data query or service request, such as a request to authenticate a user's password/username combination, a request to determine whether a user has sufficient security clearance to access restricted data or a secured application, or a request to retrieve a user profile that contains personally identifying information associated with a particular email address.

In step 505, the FRM 215 forwards the data request to the Concordance Frequency Analyzer 305. In some embodiments, the Analyzer 305 may be implemented as a component of an enhanced version of FRM 215, but in other embodiments, the Analyzer 305 may be configured as a separate software module that communicates directly with the FRM 215.

In step 510, the Concordance Frequency Analyzer 305 identifies the one or more characteristics tracked by the concordance data enumerated in Concordance Frequency Table 310.

This identification may be performed by any means known in the art. In some embodiments, for example, the identification may be communicated to the Analyzer 305 directly from the Federated Repository Manager 215 in step 505 or 510. In other embodiments, the Analyzer 305 may remember the one or more characteristics from the previous identification of step 400. In yet other examples, the Analyzer 305 may determine the one or more characteristics by examining the contents of the Concordance Frequency Table 310.

Once having identified the one or more characteristics, the Analyzer 305 in this step further identifies values of the one or more characteristics associated with the data element requested in step 500.

For example, if the one or more characteristics comprises a first alphanumeric character of a user's email address, and if the request received in step 505 identifies a user email address "harry@xyz.com," then the Analyzer 305 would in this step identify a value of the identified characteristic as the letter "h."

In step 515, the Analyzer 305 uses determinations previously made in step 425 of FIG. 4, as a function of information stored in the Concordance Frequency Table 310, to select an order in which to query repositories 220a-220f.

For example, in the running example of FIG. 4, if the one or more characteristics consists of a first character of a user's email address, and if the Concordance Frequency Table 310 is illustrated by Table 2, then a request for data related to user address "rutger@xyz.com" would result in a search order dictated by the entry of Table 2 related to a first-character value of "r." That is, User Repository 3, which contains two "r" entries, would be queried first and then, if rutger@xyz.com is not found in User Repository 3, User Repository 2, which stores one "r" entry, would be searched second. User Repository 1, which contains no "r" entries, would not be included in the repository-search sequence.

In step 520, the Analyzer 305 returns the search sequence to Federated Repository manager 215. In the running example, given that the user query of step 500 requests information associated with email address "rutger@xyz.com," Analyzer 305 would return the ordered sequence: (User Repository 3, User Repository 2).

In step 525, the Concordance Frequency Analyzer 305 may optionally update the Concordance Frequency Table 310. This may occur if the user data-access request results in an alteration to the contents of a queried repository. If, for example, the data-access request comprises a transaction to add, revise, or delete a user email address stored in a repository, completion of that transaction would result in a change to the concordance statistics enumerated in Table 310. In such a case, a corresponding entry in the table would be added, deleted, incremented, or decremented.

For example, if the query of step 500 is comprised by a user request to delete the user profile associated with "rutger@xyz.com," the Analyzer 305 in this step might decrement the "r" entry of Table 2 associated with User Repository 2, such that Table 2's "r" entry shows two "r" entries for User Repository 3 and 0 entries for User Repository 1 and User Repository 2.

What is claimed is:

1. A system for optimizing data-access from a federated repository,
    where the federated repository is a virtualized data repository containing data entries that are physically stored in a plurality of heterogeneous component repositories,
    where access to the federated repository is managed by a federated-repository management application that represents the plurality of component repositories to users as a single unified virtual registry, and
    where the system comprises a processor, a memory coupled to the processor, and a computer-readable hardware storage device coupled to the processor, the storage device containing program code configured to be run by the processor via the memory to implement a method for optimizing data access from a federated repository based on concordance frequency, the method comprising:
    the system receiving, from the federated-repository management application, a request to access a requested data element contained in the federated repository and an identification of a set of repository-specific concordance parameters that each identify a distinct repository-specific characteristic of each data entry stored in the plurality of component repositories;

the system associating with the requested data element a requested-data value of a first concordance parameter of the set of repository-specific concordance parameters;

the system retrieving from a concordance frequency table a number of entries, contained in each repository of the plurality of component repositories, that are characterized by instances of the first concordance parameter equal to the requested-data value, where the concordance frequency table is a component of the federated-repository management application that associates each data entry of each repository of the plurality of component repositories with a value of each parameter of the set of repository-specific concordance parameters;

the system counting the retrieved numbers of entries, in each repository of the plurality of component repositories, that are characterized by the requested-data value of the first concordance parameter, where the counting is performed without querying any repository of the plurality of component repositories;

the system determining a set of location probabilities, where each location probability of the set of location probabilities identifies a proportion of entries, of a corresponding repository of the plurality of component repositories, that are characterized by the requested-data value; and the system returning to the federated-repository management application a sequence in which to query each repository of the plurality of component repositories, where the sequence orders the plurality of component repositories as a monotonically decreasing function of each component repository's location probability.

2. The system of claim 1, where the determining further comprises:

the system identifying a relative probability that the requested data element is stored in a particular repository of the plurality of component repositories as a function of a number of matching data entries stored in the particular repository relative to numbers of matching data entries stored in other repositories of the plurality of component repositories.

3. The system of claim 2, further comprising:
the system generating the concordance frequency table, where each record of the concordance frequency table identifies:
a specific repository of the plurality of component repositories,
one possible value of the concordance parameter, and
a number of data entries stored in the specific repository that match the one possible value.

4. The system of claim 1, where a data entry physically stored in the plurality of component repositories comprises a user profile.

5. The system of claim 1, where the received data request is a request to authenticate credentials of a user.

6. The system of claim 1, where a first substring associated with a first repository of the plurality of component repositories identifies a first alphanumeric character of an email address stored in a column of each data entry of the first repository.

7. The system of claim 1, further comprising:
the system detecting that an operation performed by the federated-repository management application in response to receiving the received data request will alter a first number of matching data entries identified by a first record of the concordance frequency table; and the system, in response to the detecting, revising the first number of matching data entries stored in the first record.

8. A method for optimizing data access from a federated repository based on concordance frequency, where the federated repository is a virtualized data repository containing data entries that are physically stored in a plurality of heterogeneous component repositories, and where access to the federated repository is managed by a federated-repository management application that represents the plurality of component repositories to users as a single unified virtual registry, the method comprising:

receiving, from the federated-repository management application, a request to access a requested data element contained in the federated repository and an identification of a set of repository-specific concordance parameters that each identify a distinct repository-specific characteristic of each data entry stored in the plurality of component repositories;

associating with the requested data element a requested-data value of a first concordance parameter of the set of repository-specific concordance parameters;

retrieving from a concordance frequency table a number of entries, contained in each repository of the plurality of component repositories, that are characterized by instances of the first concordance parameter equal to the requested-data value, where the concordance frequency table is a component of the federated-repository management application that associates each data entry of each repository of the plurality of component repositories with a value of each parameter of the set of repository-specific concordance parameters;

counting the retrieved numbers of entries, in each repository of the plurality of component repositories, that are characterized by the requested-data value of the first concordance parameter, where the counting is performed without querying any repository of the plurality of component repositories;

determining a set of location probabilities, where each location probability of the set of location probabilities identifies a proportion of entries, of a corresponding repository of the plurality of component repositories, that are characterized by the requested-data value; and returning to the federated-repository management application a sequence in which to query each repository of the plurality of component repositories, where the sequence orders the plurality of component repositories as a monotonically decreasing function of each component repository's location probability.

9. The method of claim 8, where the determining further comprises:

the system identifying a relative probability that the requested data element is stored in a particular repository of the plurality of component repositories as a function of a number of matching data entries stored in the particular repository relative to numbers of matching data entries stored in other repositories of the plurality of component repositories.

10. The method of claim 9, further comprising:
generating the concordance frequency table, where each record of the concordance frequency table identifies:
a specific repository of the plurality of component repositories,
one possible value of the concordance parameter, and
a number of data entries stored in the specific repository that match the one possible value.

11. The method of claim 8, where a data entry physically stored in the plurality of component repositories comprises a user profile, and where the received data request is a request to authenticate credentials of a user.

12. The method of claim 8, where a first sub string associated with a first repository of the plurality of component repositories identifies a first alphanumeric character of an email address stored in a column of each data entry of the first repository.

13. The method of claim 8, further comprising:
detecting that an operation performed by the federated-repository management application in response to receiving the received data request will alter a first number of matching data entries identified by a first record of the concordance frequency table; and
in response to the detecting, revising the first number of matching data entries stored in the first record.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the associating, the retrieving, the counting, the determining, and the returning.

15. A computer program product, comprising a computer-readable hardware storage device having a computer-readable program code stored therein, the program code configured to be executed by a federated-repository optimization system comprising a processor, a memory coupled to the processor, and a computer-readable hardware storage device coupled to the processor, the storage device containing program code configured to be run by the processor via the memory to implement a method for optimizing data access from a federated repository based on concordance frequency,
where the federated repository is a virtualized data repository containing data entries that are physically stored in a plurality of heterogeneous component repositories, and
where access to the federated repository is managed by a federated-repository management application that represents the plurality of component repositories to users as a single unified virtual registry,
the method comprising:
receiving, from the federated-repository management application, a request to access a requested data element contained in the federated repository and an identification of a set of repository-specific concordance parameters that each identify a distinct repository-specific characteristic of each data entry stored in the plurality of component repositories;
associating with the requested data element a requested-data value of a first concordance parameter of the set of repository-specific concordance parameters;
retrieving from a concordance frequency table a number of entries, contained in each repository of the plurality of component repositories, that are characterized by instances of the first concordance parameter equal to the requested-data value,
where the concordance frequency table is a component of the federated-repository management application that associates each data entry of each repository of the plurality of component repositories with a value of each parameter of the set of repository-specific concordance parameters;
counting the retrieved numbers of entries, in each repository of the plurality of component repositories, that are characterized by the requested-data value of the first concordance parameter, where the counting is performed without querying any repository of the plurality of component repositories;
determining a set of location probabilities, where each location probability of the set of location probabilities identifies a proportion of entries, of a corresponding repository of the plurality of component repositories, that are characterized by the requested-data value; and
returning to the federated-repository management application a sequence in which to query each repository of the plurality of component repositories, where the sequence orders the plurality of component repositories as a monotonically decreasing function of each component repository's location probability.

16. The computer program product of claim 15, where the determining further comprises:
the system identifying a relative probability that the requested data element is stored in a particular repository of the plurality of component repositories as a function of a number of matching data entries stored in the particular repository relative to numbers of matching data entries stored in other repositories of the plurality of component repositories.

17. The computer program product of claim 16, further comprising:
generating the concordance frequency table, where each record of the concordance frequency table identifies:
a specific repository of the plurality of component repositories,
one possible value of the concordance parameter, and
a number of data entries stored in the specific repository that match the one possible value.

18. The computer program product of claim 15, where a data entry physically stored in the plurality of component repositories comprises a user profile, and where the received data request is a request to authenticate credentials of a user.

19. The computer program product of claim 15, where a first sub string associated with a first repository of the plurality of component repositories identifies a first alphanumeric character of an email address stored in a column of each data entry of the first repository.

20. The computer program product of claim 15, further comprising:
detecting that an operation performed by the federated-repository management application in response to receiving the received data request will alter a first number of matching data entries identified by a first record of the concordance frequency table; and
in response to the detecting, revising the first number of matching data entries stored in the first record.

\* \* \* \* \*